Jan. 18, 1938. H. R. SLUSSER 2,106,127
ROLLER BEARING
Filed Sept. 21, 1936
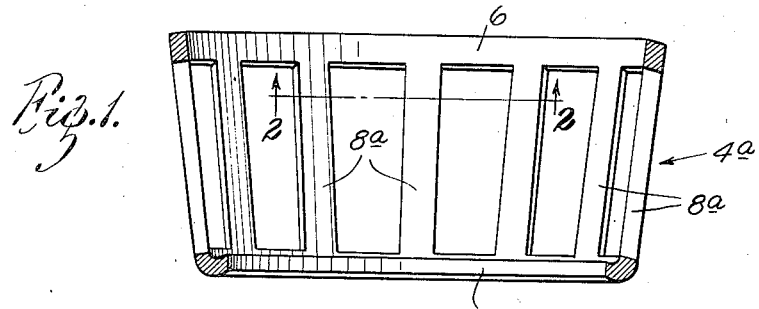
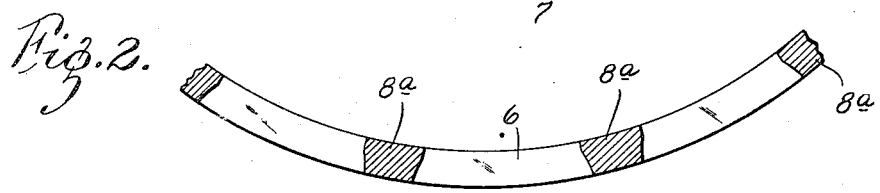
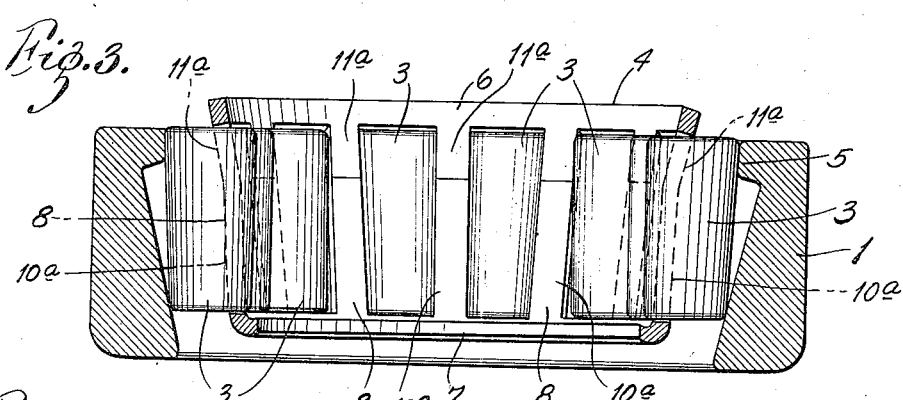
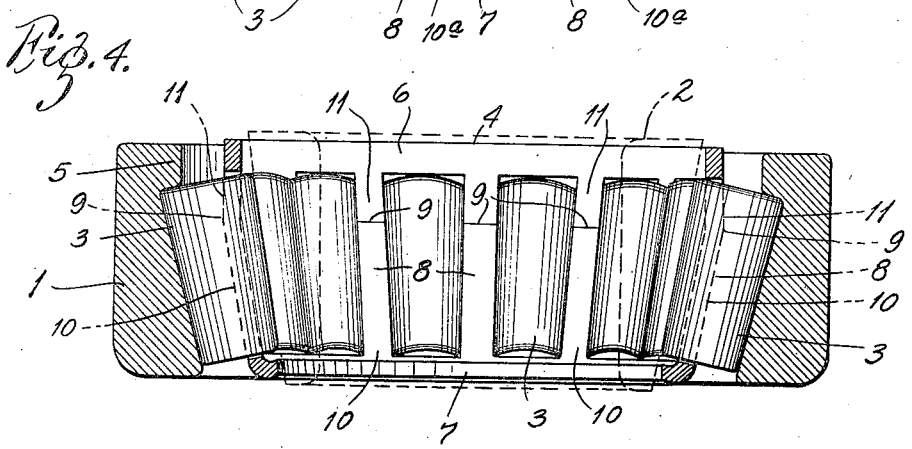
INVENTOR:
Harry R. Slusser,
by Carr & Carr & Gravely,
HIS ATTORNEYS.

Patented Jan. 18, 1938

2,106,127

UNITED STATES PATENT OFFICE 2,106,127

ROLLER BEARING

Harry R. Slusser, Canton, Ohio, assignor to The Timken Roller Bearing Company, Canton, Ohio, a corporation of Ohio Application September 21, 1936, Serial No. 101,759

3 Claims. (Cl. 308—218)

My invention relates to taper roller bearings of the type wherein the cup or outer bearing member is provided at the large end of its raceway with an inwardly extending flange or thrust rib. The principal object of the invention is to provide for the use of an integral roller cage. The invention consists principally in forming a one-piece cage blank with continuous end rings connected by straight bridges whose sides are adapted to serve, in their final position, as the sides of the roller pockets, swinging said bridge members inwardly about their points of attachment to the end rings, positioning the cage, with the rollers therein, inside the cup, and then swinging said bridge sections outwardly on said points of attachment beyond the initial position of the bridges to bring the bridges into pocket-forming relation with the rollers for the major portion of their length inwardly from the small end ring.
The invention also consists in the bearing and in the self-locked assembly unit comprising cup roller and cage. It also consists in the arrangements and combinations of parts hereinafter described and claimed.
In the accompanying drawing which forms part of this specification wherein like reference numerals refer to like parts wherever they occur, Fig. 1 is a longitudinal section of a cage blank and Fig. 2 is an enlarged cross-section of a part of the blank on the line 2—2 of Fig. 1;

Fig. 3 is a longitudinal sectional view showing the cup, the cage and the rollers in course of assembly; and Fig. 4 is a similar view of the parts assembled.
My bearing comprises a cup 1 or outer raceway member with an interior conical bearing surface, a cone 2 or conical inner raceway member with an exterior conical raceway surface, a series of taper rollers 3 between said inner and outer raceway members, and a conical cage 4 with pockets through which said rollers extend.

The cup 1 or outer raceway member is provided with an inwardly extending annular rib 5 at the large end of its raceway; and the axially inward surface of this rib is formed into a raceway for the large ends of the rollers to bear against. The inside diameter of this thrust rib is larger than the inside diameter of the small end of the raceway of the cup.
The cage 4 comprises continuous end rings 6, 7 integrally connected by bridges 8 whose side walls are suitably spaced and designed for cooperation with the rollers in the respective pockets formed between such bridges. In the finished assembly, the bridges are not straight from end ring to end ring but have a break in their direction at a point 9 somewhat closer to the large end ring 6 than to the small end ring 7, thus dividing the bridges into long straight sections 10 that adjoin the small end ring, and short straight sections 11 adjoining the large end ring, said sections being integral with each other. In the finished assembly, the short sections 11 are arranged cylindrically, that is, substantially parallel with the axis of the bearing; but the long sections 10 of the bridges are arranged conically in proper relation to the rolls to space and guide them.

The cage 4 is of smaller diameter than the imaginary cone in which the axes of the rollers lie, and the cage pockets are narrower than the rollers. In consequence of this relation, the cup, the rollers and the cage constitute a self-locked assembly which can be handled without any danger of any of its elements becoming dislocated or separated.

The cage is designed and manufactured with particular reference to the problem of assembly into a self-locking unit. For this purpose, a conical cage blank 4a is made with continuous end rings 6, 7 connected by straight bridges 8a, said end rings of the blanks having the same dimensions as in the finished cage and the side faces of the bridges of the blank being shaped to serve as the side walls of the roller pockets. For the purpose of assembling the cup, cage and rollers, these straight bridges are swung inwardly at both ends, forming long straight sections 10a adjoining the small end ring and short straight sections 11a adjoining the large end ring. The large ends of the pockets in the cage are made wide enough for the large ends of the rollers therein to move toward the axis of the bearing sufficiently to permit such caged rollers to be moved longitudinally past the thrust rib of the cup. With the cage in this condition, (see Fig. 3) the taper rollers 3 are placed in its pockets and the cage, together with its rollers, are positioned in the cup.

This positioning operation may be effected by moving the cup in an axial direction relative to the cage so that the thrust rib 5 of the cup will ride longitudinally along the rollers, beginning at the small ends of the rollers and continuing until said thrust rib passes the large ends of the rollers; the cup may be stationary and the cage, together with the rollers in its pockets, may be moved axially so that its rollers will ride, small end first, past said thrust rib. When the caged rollers are in proper longitudinal position relative to the cup, the bridge members are swung outwardly on the respective end rings beyond the initial position of the continuously straight bridges, so that there is a break in the direction of the bridges at a point that will produce the straight long sections adjoining the small end rings and straight short sections adjoining the small end rings as hereinbefore described. This is the final position of the bridges and in this position, as stated above, the cup, the rollers and the cage are locked together in an assembled unit.

In the drawing, the break in the surface of the bridge is located about one-third of the length thereof from the large end ring, but this position is subject to considerable change. Likewise, while the small straight portions of the bridges are shown as being substantially cylindrical, their disposition is subject to variation, but in all cases, there is a reentrant angle in the inner surface of the bridges.

What I claim is:

1. A roller bearing comprising a cup having a conical raceway and a thrust rib at the larger end of said raceway, taper rollers on said raceway and a one piece cage for said rollers, said cage being of smaller diameter than the imaginary cone of the roll axes and comprising continuous end rings connected by bridges integral therewith and the large ends of the pockets between said bridges being wide enough to permit radial movement of the large ends of the rollers in the operation of assembling or disassembling the bearing, each of said bridges having a reentrant angle in its inner face defining a relatively long straight portion adjoining the small end ring and in pocket-forming relation to the rollers and a relatively short portion adjacent to the large ring.

2. A roller bearing comprising a cup having a conical raceway and a thrust rib at the larger end of said raceway, taper rollers on said raceway and a one piece cage for said rollers, said cage being of smaller diameter than the imaginary cone of the roll axes and comprising continuous end rings connected by bridges integral therewith and the large ends of the pockets between said bridges being wide enough to permit radial movement of the large ends of the rollers in the operation of assembling or disassembling the bearing, each of said bridges having a break in its inner surface closer to the large end ring than to the small end ring and defining a relatively long straight portion adjoining the small end ring and in pocket-forming relation to the rollers and a relatively short portion adjacent to the large ring and deflected inwardly with relation to the long portion.

3. A roller bearing comprising a cup, which has a conical raceway and a thrust rib at the larger end of said raceway, taper rollers on said raceway, and a one piece cage for said rollers, said cage being of smaller diameter than the imaginary cone of the roll axes and comprising continuous end rings connected by bridges integral therewith, said bridges having relatively short straight portions adjacent to the large end ring and substantially parallel with the axis of the bearing, and relatively long straight portions adjoining the small end ring and in pocket-forming relation to the rollers.

HARRY R. SLUSSER.